(12) United States Patent
Berkobin et al.

(10) Patent No.: US 8,265,855 B2
(45) Date of Patent: Sep. 11, 2012

(54) METHODS AND SYSTEMS FOR MOBILE CARBON DIOXIDE MONITORING

(75) Inventors: Eric Berkobin, Woodstock, GA (US); Erik Goldman, St. Charles, MO (US)

(73) Assignee: HTI IP, L.L.C., Atlanta, GA (US)

( * ) Notice: Subject to any disclaimer, the term of this patent is extended or adjusted under 35 U.S.C. 154(b) by 904 days.

(21) Appl. No.: 12/248,716

(22) Filed: Oct. 9, 2008

(65) Prior Publication Data

US 2009/0125180 A1 May 14, 2009

Related U.S. Application Data

(60) Provisional application No. 60/979,725, filed on Oct. 12, 2007, provisional application No. 60/984,547, filed on Nov. 1, 2007.

(51) Int. Cl.
*G06F 19/00* (2006.01)
(52) U.S. Cl. ........................ 701/103; 701/109
(58) Field of Classification Search .................. 701/207, 701/213, 102, 101, 103, 109, 114, 29, 31, 701/33, 35
See application file for complete search history.

(56) References Cited

U.S. PATENT DOCUMENTS

| | | | |
|---|---|---|---|
| 6,001,499 A * | 12/1999 | Grot et al. | 429/412 |
| 7,914,758 B2 * | 3/2011 | Murray et al. | 423/220 |
| 2010/0042453 A1 * | 2/2010 | Scaramellino et al. | 705/7 |
| 2010/0185521 A1 * | 7/2010 | Lewis | 705/17 |

* cited by examiner

*Primary Examiner* — Richard M. Camby
(74) *Attorney, Agent, or Firm* — John L. Doughty

(57) ABSTRACT

A telematics device coupled to vehicle onboard computer system calculates carbon dioxide output of the vehicle. The device uses inputs from existing vehicle performance and parameter sensors, such as speed, fuel efficiency, mass air flow and oxygen present in the vehicle's exhaust, to calculate carbon dioxide output. Speed divided by fuel efficiency results in gallons per hour. An emmission factor, EF, multiplied by the gallons per hour results in weight of carbon dioxide produced by the vehicle per hour. Dividing EF by the efficiency results in pounds per mile. Using input from the mass air flow and oxygen sensors, with an approximation of gasoline molecular weight may produce more accurate results without using EF. If the sensors do not provide values in the units needed, a calibration curve for the mass air flow sensor and oxygen sensor may be used. The telematics device can display the results or upload them.

8 Claims, 7 Drawing Sheets

METHODS AND SYSTEMS FOR MOBILE CARBON DIOXIDE MONITORING

CROSS REFERENCE TO RELATED APPLICATIONS

This application claims priority under 35 U.S.C. §119(e) to U.S. Provisional applications 60/979,725 filed Oct. 12, 2007, and 60/984,547 filed Nov. 1, 2007 (collectively "The Provisional Applications"), both entitled "Methods and systems for mobile carbon dioxide monitoring," and this application incorporates The Provisional Applications by reference in their entireties.

SUMMARY

Disclosed are methods and systems related to mobile carbon dioxide monitoring utilizing a vehicle telematics unit (VTU). Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems disclosed.

DETAILED DESCRIPTION

Figure 1:
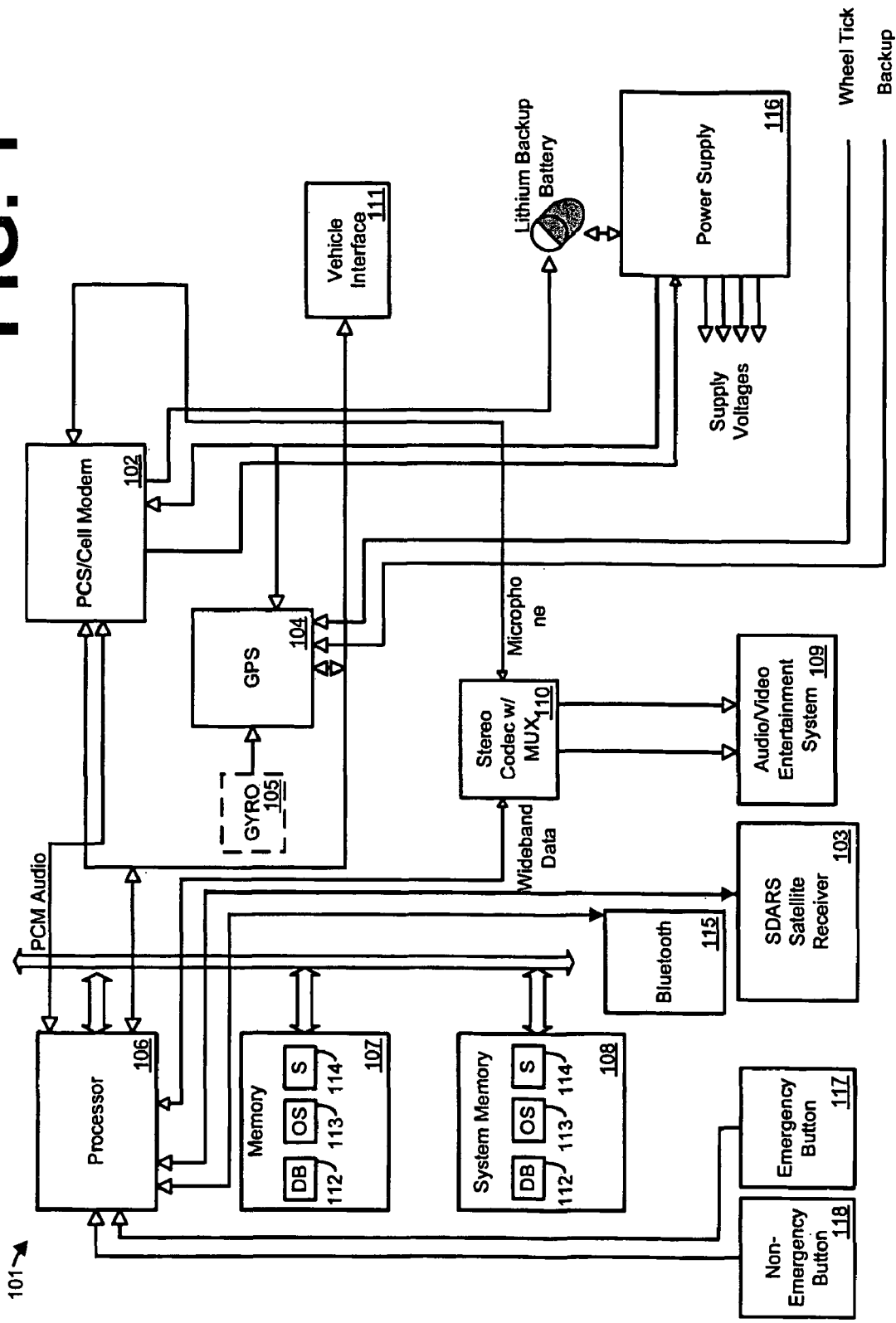
FIG. 1 is an exemplary VTU.

Before the present methods and systems are disclosed and described, it is to be understood that the methods and systems are not limited to specific components and as such may vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that the throughout the application, data is provided in a number of different formats, and that this data, represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment.

"Optional" or "optionally" means that the subsequently described event or circumstance may or may not occur, and that the description includes instances where said event or circumstance occurs and instances where it does not.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments of the methods and systems and the Examples included therein and to the Figures and their previous and following description.

In one aspect, provided is an apparatus for mobile $CO_2$ monitoring, comprising a memory configured for storing vehicle operating data, wherein the vehicle operating data comprises fuel efficiency, vehicle speed, and $CO_2$ consumption. The apparatus further comprises a vehicle interface for obtaining vehicle operating data from a vehicle and a processor, coupled to the memory and the vehicle interface, configured for performing steps comprising determining fuel efficiency, determining vehicle speed, and determining $CO_2$ consumption based on the fuel efficiency and the vehicle speed. The apparatus further comprises a transceiver, coupled to the processor, configured for transmitting the $CO_2$ consumption to a central monitoring station.

The apparatus can be configured to perform the methods described herein. The processor can be further configured to perform the steps comprising determining fuel efficiency in miles per gallon (mi/gal), determining vehicle speed in miles per hour (mi/hr), and determining $CO_2$ consumption by (mi/hr)/(mi/gal)*EF, wherein EF is an emissions factor in lbs/gal.

The value of EF can be determined by the processor. In one aspect, the processor can be configured for performing the steps comprising retrieving a first baseline EF for a first fuel, retrieving a second baseline EF for a second fuel, determining a fuel composition, wherein the fuel is composed of a percentage of the first fuel and a percentage of the second fuel, and determining the EF based on the first baseline EF, second baseline EF, and the fuel composition.

The value of EF can be obtained from a third party. The processor can be further configured to perform the steps comprising monitoring pollution readiness monitors for the presence of gases other than $CO_2$ in an exhaust stream and setting EF<the third party value if the pollution readiness monitors indicate a failure. The processor can be further configured to perform the steps comprising determining a fuel mixture, setting EF<the third party value if the fuel mixture is rich, and setting EF<the third party value if the fuel mixture is lean. The processor can be further configured to perform the step comprising adjusting the fuel mixture to maximize $CO_2$ production. The fuel mixture can be adjusted so that combustion is stoichiometric.

The processor can be further configured to perform the step comprising averaging the $CO_2$ consumption over a predetermined time period. The processor can be further configured to perform the steps comprising determining a distance traveled and averaging the $CO_2$ consumption over the distance traveled.

The step of determining the distance traveled can comprise one of retrieving distance traveled from an odometer, a GPS, or time traveled at the vehicle speed. The processor can be further configured to perform the steps comprising determining location related data utilizing a GPS and tagging the $CO_2$ consumption with the location related data prior to transmission. The processor can be further configured to perform the step comprising determining $CO_2$ consumption for a geographic region.

The apparatus can further comprise a display device configured for displaying the $CO_2$ consumption to a vehicle occupant as lbs/hour. The display device can be, for example, a gauge. The gauge can be digital or analog. The display device can also be an in-vehicle display device, such as an LCD screen, a CRT screen, an indicator light, and the like.

In an aspect, provided is an apparatus comprising a telematics control unit configured for mobile carbon dioxide monitoring. The apparatus can be installed in a vehicle. Such vehicles include, but are not limited to, personal and commercial automobiles, motorcycles, transport vehicles, watercraft, aircraft, and the like. For example, an entire fleet of a vehicle manufacturer's vehicles can be equipped with the apparatus. The apparatus 101, is also referred to herein as the VTU 101. The apparatus can perform any of the methods disclosed herein in part and/or in their entireties.

All components of the telematics unit can be contained within a single box and controlled with a single core processing subsystem or can be comprised of components distributed throughout a vehicle. Each of the components of the apparatus can be separate subsystems of the vehicle, for example, a communications component such as a Satellite Digital Audio Radio Service (SDARS), or other satellite receiver, can be coupled with an entertainment system of the vehicle.

An exemplary apparatus 101 is illustrated in FIG. 1. This exemplary apparatus is only an example of an apparatus and is not intended to suggest any limitation as to the scope of use or functionality of operating architecture. Neither should the apparatus be necessarily interpreted as having any dependency or requirement relating to any one or combination of components illustrated in the exemplary apparatus. The apparatus 101 can comprise one or more communications components. Apparatus 101 illustrates communications components (modules) PCS/Cell Modem 102 and SDARS receiver 103. These components can be referred to as vehicle mounted transceivers when located in a vehicle. PCS/Cell Modem 102 can operate on any frequency available in the country of operation, including, but not limited to, the 850/1900 MHz cellular and PCS frequency allocations. The type of communications can include, but is not limited to GPRS, EDGE, UMTS, 1xRTT or EV-DO. The PCS/Cell Modem 102 can be a Wi-Fi or mobile Worldwide Interoperability for Microwave Access (WIMAX) implementation that can support operation on both licensed and unlicensed wireless frequencies. The apparatus 101 can comprise an SDARS receiver 103 or other satellite receiver. SDARS receiver 103 can utilize high powered satellites operating at, for example, 2.35 GHz to broadcast digital content to automobiles and some terrestrial receivers, generally demodulated for audio content, but can contain digital data streams.

PCS/Cell Modem 102 and SDARS receiver 103 can be used to update an onboard database 112 contained within the apparatus 101. Updating can be requested by the apparatus 101, or updating can occur automatically. For example, database updates can be performed using FM subcarrier, cellular data download, other satellite technologies, Wi-Fi and the like. SDARS data downloads can provide the most flexibility and lowest cost by pulling digital data from an existing receiver that exists for entertainment purposes. An SDARS data stream is not a channelized implementation (like AM or FM radio) but a broadband implementation that provides a single data stream that is separated into useful and applicable components.

GPS receiver 104 can receive position information from a constellation of satellites operated by the U.S. Department of Defense. Alternately, the GPS receiver 104 can be a GLONASS receiver operated by the Russian Federation Ministry of Defense, or any other positioning device capable of providing accurate location information (for example, LORAN, inertial navigation, and the like). GPS receiver 104 can contain additional logic, either software, hardware or both to receive the Wide Area Augmentation System (WAAS) signals, operated by the Federal Aviation Administration, to correct dithering errors and provide the most accurate location possible. Overall accuracy of the positioning equipment subsystem containing WAAS is generally in the two meter range. Optionally, the apparatus 101 can comprise a MEMS gyro 105 for measuring angular rates and wheel tick inputs for determining the exact position based on dead-reckoning techniques. This functionality is useful for determining accurate locations in metropolitan urban canyons, heavily tree-lined streets and tunnels.

One or more processors 106 can control the various components of the apparatus 101. Processor 106 can be coupled to removable/non-removable, volatile/non-volatile computer storage media. By way of example, FIG. 1 illustrates memory 107, coupled to the processor 106, which can provide non-volatile storage of computer code, computer readable instructions, data structures, program modules, and other data for the computer 101. For example and not meant to be limiting, memory 107 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

The processing of the disclosed systems and methods can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Any number of program modules can be stored on the memory 107, including by way of example, an operating system 113 and software 114. Each of the operating system 113 and software 114 (or some combination thereof) can comprise elements of the programming and the software 114. Data can also be stored on the memory 107 in database 112. Database 112 can be any of one or more databases known in the art. Examples of such databases comprise, DB2®, Microsoft® Access, Microsoft® SQL Server, Oracle®, mySQL, PostgreSQL, and the like. The database 112 can be centralized or distributed across multiple systems. The software 114 can comprise monitoring software 206 and the data can comprise monitoring data.

By way of example, the operating system 113 can be a Linux (Unix-like) operating system. One feature of Linux is that it includes a set of "C" programming language functions referred to as, "NDBM". NDBM is an API for maintaining key/content pairs in a database which allows for quick access to relatively static information. NDBM functions use a simple hashing function to allow a programmer to store keys and data in data tables and rapidly retrieve them based upon the assigned key. A major consideration for an NDBM database is that it only stores simple data elements (bytes) and requires unique keys to address each entry in the database. NDBM functions provide a solution that is among the fastest and most scalable for small processors.

It is recognized that such programs and components reside at various times in different storage components of the apparatus 101, and are executed by the processor 106 of the apparatus 101. An implementation of reporting software 114 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

FIG. 1 illustrates system memory 108, coupled to the processor 106, which can comprise computer readable media in the form of volatile memory, such as random access memory (RAM, SDRAM, and the like), and/or non-volatile memory, such as read only memory (ROM). The system memory 108 typically contains data and/or program modules such as operating system 113 and software 114 that are immediately accessible to and/or are presently operated on by the processor 106. The operating system 113 can comprise a specialized task dispatcher, slicing available bandwidth among the necessary tasks at hand, including communications management, position determination and management, entertainment radio management, SDARS data demodulation and assessment, power control, and vehicle communications.

The processor 106 can control additional components within the apparatus 101 to allow for ease of integration into vehicle systems. The processor 106 can control power to the components within the apparatus 101, for example, shutting off GPS receiver 104 and SDARS receiver 103 when the vehicle is inactive, and alternately shutting off the PCS/Cell Modem 102 to conserve the vehicle battery when the vehicle is stationary for long periods of inactivity. The processor 106 can also control an audio/video entertainment subsystem 109 and comprise a stereo codec and multiplexer 110 for providing entertainment audio and video to the vehicle occupants, for providing wireless communications audio (PCS/Cell phone audio), speech recognition from the driver compartment for manipulating the SDARS receiver 103 and PCS/Cell Modem 102 phone dialing, and text to speech and pre-recorded audio for vehicle status annunciation.

The apparatus 101 can interface and monitor various vehicle systems and sensors to determine vehicle conditions. Apparatus 101 can interface with a vehicle through a vehicle interface 111. The vehicle interface 111 can include, but is not limited to, OBD (On Board Diagnostics) port, OBD-II port, CAN (Controller Area Network) port, and the like. The vehicle interface 111, allows the apparatus 101 to receive data indicative of vehicle performance, such as vehicle trouble codes, operating temperatures, operating pressures, speed, fuel air mixtures, oil quality, oil and coolant temperatures, wiper and light usage, mileage, break pad conditions, and any data obtained from any discrete sensor that contributes to the operation of the vehicle engine and drive-train computer. Additionally CAN interfacing can eliminate individual dedicated inputs to determine brake usage, backup status, and it can allow reading of onboard sensors in certain vehicle stability control modules providing gyro outputs, steering wheel position, accelerometer forces and the like for determining driving characteristics. The apparatus 101 can interface directly with a vehicle subsystem or a sensor, such as an accelerometer, gyroscope, airbag deployment computer, and the like. Data obtained, and processed data derived from, from the various vehicle systems and sensors can be transmitted to a central monitoring station via the PCS/Cell Modem 102.

Communication with a vehicle driver can be through an infotainment (radio) head (not shown) or other display device (not shown). More than one display device can be used.

Examples of display devices include, but are not limited to, a monitor, an LCD (Liquid Crystal Display), a projector, and the like.

The apparatus 101 can receive power from power supply 116. The power supply can have many unique features necessary for correct operation within the automotive environment. One mode is to supple a small amount of power (typically less than 100 microamps) to at least one master controller that can control all the other power buses inside of the VTU 101. In an exemplary system, a low power low dropout linear regulator supplies this power to PCS/Cellular modem 102. This provides the static power to maintain internal functions so that it can await external user push-button inputs or await CAN activity via vehicle interface 111. Upon receipt of an external stimulus via either a manual push button or CAN activity, the processor contained within the PCS/Cellular modem 102 can control the power supply 116 to activate other functions within the VTU 101, such as GPS 104/GYRO 105, Processor 106/Memory 107 and 108, SDARS receiver 103, audio/video entertainment system 109, audio codec mux 110, and any other peripheral within the VTU 101 that does not require standby power.

In an exemplary system, there can be a plurality of power supply states. One state can be a state of full power and operation, selected when the vehicle is operating. Another state can be a full power relying on battery backup. It can be desirable to turn off the GPS and any other non-communication related subsystem while operating on the back-tip batteries. Another state can be when the vehicle has been shut off recently, perhaps within the last 30 days, and the system maintains communications with a two-way wireless network for various auxiliary services like remote door unlocking and location determination messages. After the recent shut down period, it is desirable to conserve the vehicle battery by turning off almost all power except the absolute minimum in order to maintain system time of day clocks and other functions, waiting to be awakened on CAN activity. Additional power states are contemplated, such as a low power wakeup to check for network messages, but these are nonessential features to the operation of the VTU.

Normal operation can comprise, for example, the PCS/Cellular modem 102 waiting for an emergency pushbutton key-press or CAN activity. Once either is detected, the PCS/Cellular modem 102 can awaken and enable the power supply 116 as required. Shutdown can be similar wherein a first level shutdown turns off everything except the PCS/Cellular modem 102, for example. The PCS/Cellular modem 102 can maintain wireless network contact during this state of operation. The VTU 101 can operate normally in the state when the vehicle is turned off. If the vehicle is off for an extended period of time, perhaps over a vacation etc., the PCS/Cellular modem 102 can be dropped to a very low power state where it no longer maintains contact with the wireless network.

Additionally, in FIG. 1, subsystems can include a BlueTooth transceiver 115 that can be provided to interface with occupant supplied devices such as phones, headsets, and music players. Emergency button 117 can be coupled to the processor 106. The emergency button 117 can be located in a vehicle cockpit and activated an occupant of the vehicle. Activation of the emergency button 117 can cause processor 106 to initiate a voice and data connection from the vehicle to a central monitoring station, also referred to as a remote call center. Data such as GPS location and occupant personal information can be transmitted to the call center. The voice connection permits two way voice communication between a vehicle occupant and a call center operator. The call center operator can have local emergency responders dispatched to the vehicle based on the data received. In another embodiment, the connections are made from the vehicle to an emergency responder center.

One or more non-emergency buttons 118 can be coupled to the processor 106. One or more non-emergency buttons 118 can be located in a vehicle cockpit and activated by an occupant of the vehicle. Activation of the one or more non-emergency buttons 118 can cause processor 106 to initiate a voice and data connection from the vehicle to a remote call center. Data such as GPS location and occupant personal information can be transmitted to the call center. The voice connection permits two way voice communication between a vehicle occupant and a call center operator. The call center operator can provide location based services to the vehicle occupant based on the data received and the vehicle occupant's desires. For example, a button can provide a vehicle occupant with a link to roadside assistance services such as towing, spare tire changing, refueling, and the like. In another embodiment, a button can provide a vehicle occupant with concierge-type services, such as local restaurants, their locations, and contact information; local service providers their locations, and contact information; travel related information such as flight and train schedules; and the like.

For any voice communication made through the VTU 101, text-to-speech algorithms can be used so as to convey predetermined messages in addition to or in place of a vehicle occupant speaking. This allows for communication when the vehicle occupant is unable or unwilling to communicate vocally.

VTU 101 can communicate with one or more computers, either through direct wireless communication and/or through a network such as the Internet. Such communication can facilitate data transfer, voice communication, and the like. One skilled in the art will appreciate that what follows is a functional description of an exemplary operating environment and that functions can be performed by software, F by hardware, or by any combination of software and hardware.

Figure 2:
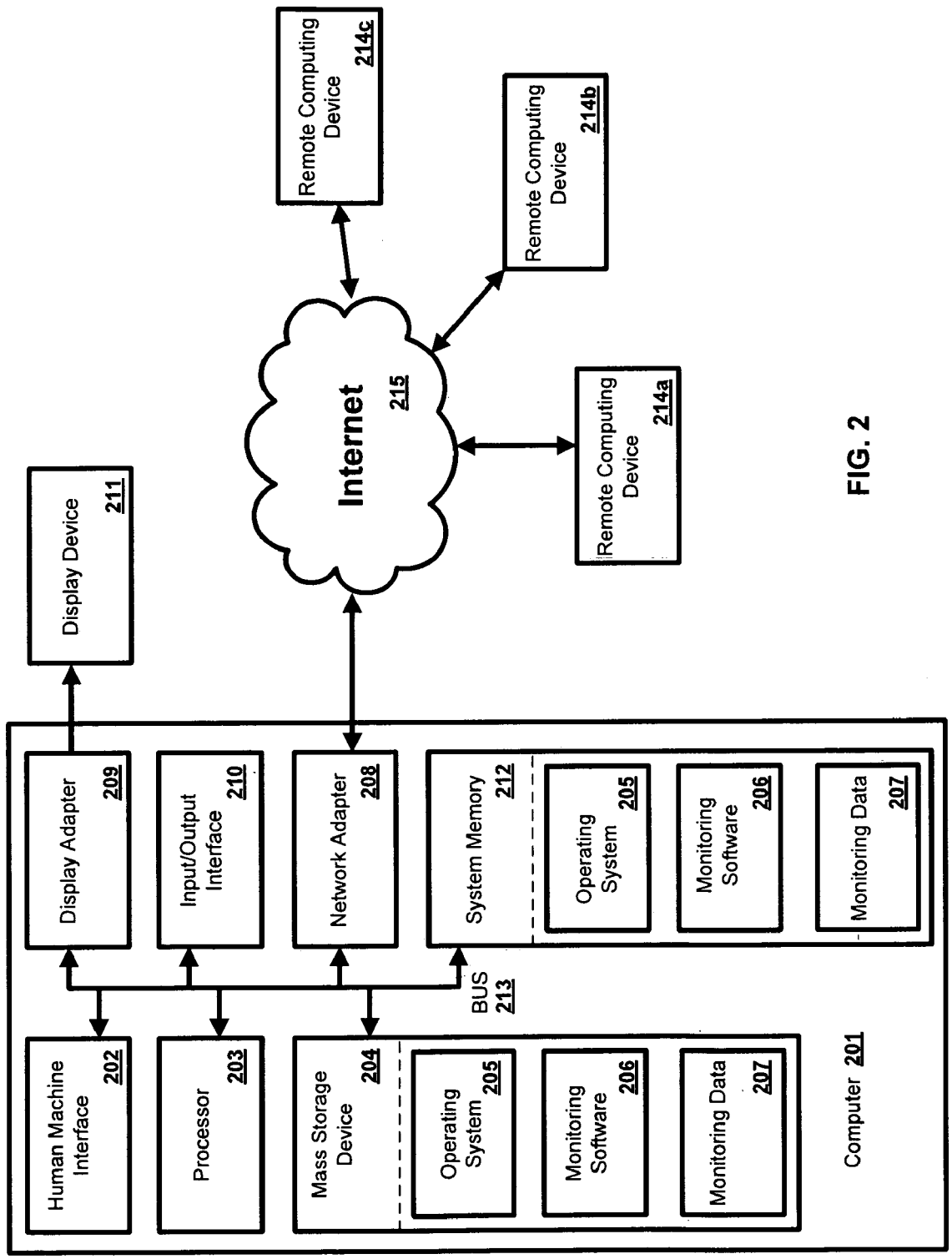
FIG. 2 is an exemplary computing device.

FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

In another aspect, the methods and systems can be described in the general context of computer instructions, such as program modules, being executed by a computer. Generally, program modules comprise routines, programs, objects, components, data structures, etc. that perform particular tasks or implement particular abstract data types. The methods and systems can also be practiced in distributed computing environments where tasks are performed by remote processing devices that are linked through a communications network. In a distributed computing environment, program modules can be located in both local and remote computer storage media including memory storage devices.

Further, one skilled in the art will appreciate that the system and method disclosed herein can be implemented via a general-purpose computing device in the form of a computer 201. The components of the computer 201 can comprise, but are not limited to, one or more processors or processing units 203, a system memory 212, and a system bus 213 that couples various system components including the processor 203 to the system memory 212.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus also known as a Mezzanine bus. The bus 213, and all buses specified in this description can also be implemented over a wired or wireless network connection and each of the subsystems, including the processor 203, a mass storage device 204, an operating system 205, monitoring software 206, monitoring data 207, a network adapter (or communications interface) 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system. In one aspect, a remote computing device can be a VTU 101.

The computer 201 typically comprises a variety of computer readable media. Exemplary readable media can be any available media that is accessible by the computer 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as monitoring data 207 and/or program modules such as operating system 205 and monitoring software 206 that are immediately accessible to and/or are presently operated on by the processing unit 203. Monitoring data 207 can comprise any data generated in conjunction with identification of a value opportunity, conversion of a value opportunity into benefit, fee management, and benefit opportunity research.

In another aspect, the computer 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computer 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and monitoring software 206. Each of the operating system 205 and monitoring software 206 (or some combination thereof) can comprise elements of the programming and the monitoring software 206. Monitoring data 207 can also be stored on the mass storage device 204. Monitoring data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computer 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computer 201 via Input/Output Interface 210.

The computer 201 can operate in a networked environment using logical connections to one or more remote computing devices 214a,b,c. By way of example, a remote computing device can be a personal computer, portable computer, a server, a router, a network computer, a VTU 101, a PDA, a cellular phone, a "smart" phone, a wireless communications enabled key fob, a peer device or other common network node, and so on. Logical connections between the computer 201 and a remote computing device 214a,b,c can be made via a local area network (LAN) and a general wide area network (WAN). Such network connections can be through a network adapter 208. A network adapter 208 can be implemented in both wired and wireless environments. Such networking environments are conventional and commonplace in offices, enterprise-wide computer networks, intranets, and the Internet 215. In one aspect, the remote computing device 214a,b,c can be one or more VTU 101's.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of monitoring software 206 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

All vehicles (under 8500 pounds GVW) sold in the United States since 1996 require an On-Board Diagnostics (OBD) connector to monitor the proper operation of the engine's combustion process. By monitoring the proper operation of the combustion process and with that process being under closed-loop computer control, the amount of harmful tailpipe pollutants can be accurately predicted and enforced by reading the status of the internal process monitors via the OBD connector. Even so, the amount of harmful tailpipe pollutants is a small percentage of the tailpipe emission stream which is predominantly carbon dioxide ($CO_2$) and water vapor ($H_2O$). Provided are methods and systems that can utilize a telematics device, such as VTU 101 connected to one or more vehicle communications busses with access to combustion monitoring parameters. In one aspect, the methods and systems can measure how much $CO_2$ the vehicle (and engine it is mounted to) is creating and provide this data to a central database in real-time and/or near-real-time.

The methods and systems provided can, without affecting existing vehicle pollution emissions monitoring capabilities, monitor engine operation relative to $CO_2$ creation and measure over time how much $CO_2$ the engine has generated and placed into the atmosphere. The telematics aspect provides for timely wireless communication of this data to a central database.

Figure 3:
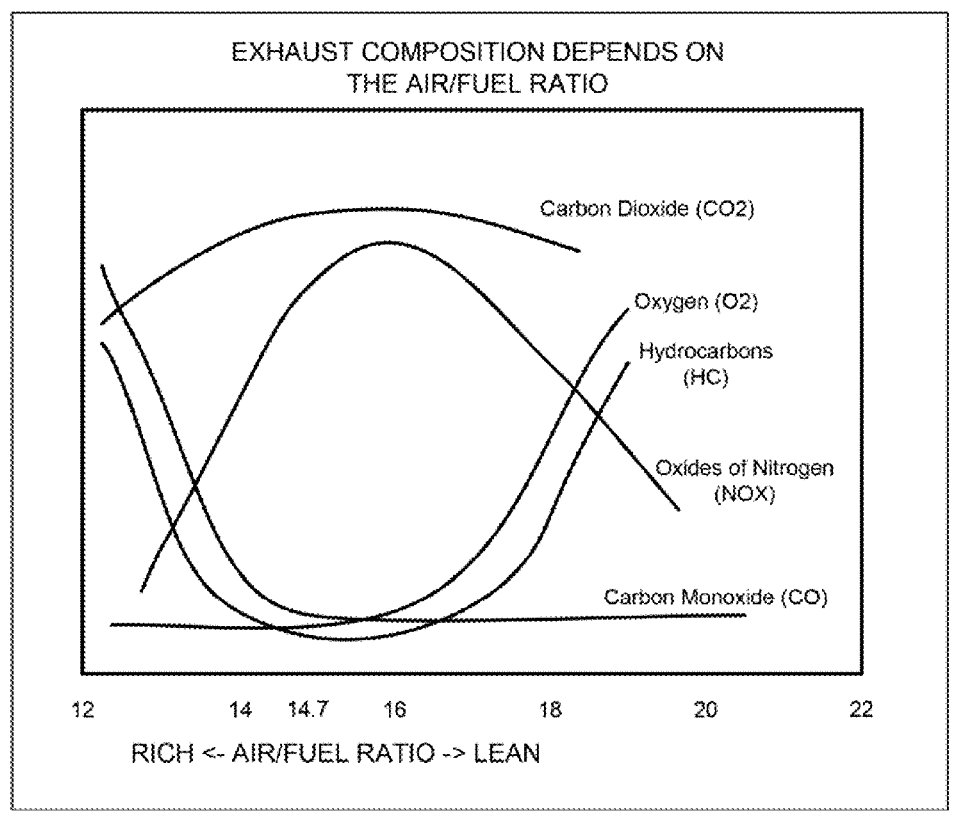
FIG. 3 illustrates emission composition.

Currently, there are two main types of Internal Combustion (IC) engine Spark Ignition (SI) which burns gasoline fuel and Compression Ignition (CI) which burns diesel fuel. The methods and systems provided are operative with both types of engines. Furthermore, the methods and systems provided are operative with alternative fuel engines, such as fuel cell, electric, and the like. Combustion can produce mostly carbon dioxide ($CO_2$) and water vapor ($H_2O$). All engines operate at combustion set-points (Air/Fuel ratio). At these set-points the $CO_2$ level can be mathematically computed. Sub-optimal operation indicates a problem with an engine (i.e., polluting). At sub-optimal operation, the $CO_2$ can be mathematically computed. There are typically four main parameters which determine the emission in an engine: chemical composition of the fuel, homogeneity of the Air/Fuel mixture, Air/Fuel ratio, and ignition timing. Air/Fuel ratio can have the greatest influence on emission. As shown in FIG. 3, the main components of emission are carbon monoxide, carbon dioxide, nitrogen oxide, hydrocarbons, and oxygen.

Provided herein is a combustion process set-point for control of an Air/Fuel ratio. As shown in FIG. 3, combustion is stoichiometric when the Air/Fuel ratio is nominally 14.7 to 1. $O_2$ sensors can measure the actual combustion process and, working with electronic engine controllers, can keep the process balanced between rich and lean Air/Fuel mixtures as the optimal set-point. Engine controllers are also able to move the Air/Fuel ratio in real-time based on the oxygen content of the fuel. This information can be made available to the VTU to adjust $CO_2$ calculations. Also, the condition of the traditional pollution emissions readiness monitors built into the vehicle in support of OBDII regulations can be used by the VTU to adjust the $CO_2$ calculations. In some instances, all of the fuel is consumed, pollution is minimized, and $CO_2$ is maximized. Operating in this fashion there is a nominal creation of 19.1 pounds of $CO_2$ produced for every gallon of fuel consumed. Specific amounts of $CO_2$ will vary with the specific composition of the gasoline fuel, as well as diesel fuel, biodiesel fuel, and gasoline alternatives made from plants (ethanol fuel, etc.). In all cases, there is a specific nominal amount of $CO_2$ created for each gallon of fuel consumed.

Provided herein are methods and systems for measurement of $CO_2$. The methods and systems can measure instantaneous $CO_2$ produced using an amount of fuel being consumed. In one aspect, an average over time can provide a $CO_2$ production operational profile. In one aspect, a profile of $CO_2$ based on speed can determine an optimal driving speed or profile to reduce $CO_2$ production. The production operational profile combined with speed can provide $CO_2$ production for distance traveled. An alternative to combining this information with speed to determine distance is to use GPS information. When combined with a specific time period the methods and systems can provide $CO_2$ production daily/weekly/etc.

In some aspects, the methods and systems can provide a $CO_2$ production profile over time for a specific vehicle, for a group of vehicles, for a class of vehicles, and the like. In other aspects, the methods and systems can combine a $CO_2$ production profile with GPS data to provide a regional $CO_2$ footprint, a roadway (highway) $CO_2$ footprint and the like. In further aspects, the methods and systems can combine a $CO_2$ production profile with GPS data and weather data to provide an air quality indicator.

Also provided herein are methods and systems for use of $CO_2$ data. $CO_2$ data can be used to indicate proper and/or optimal operation of a vehicle. Also, $CO_2$ data can be used to indicate when a vehicle requires repair and/or replacement of one or more components of the vehicle or the entire vehicle.

$CO_2$ consumption and/or profile data can also be made available by the VTU to other electronic controllers in the vehicle to display the driver's $CO_2$ consumption and/or profile on a dashboard display much the same way fuel consumption and other critical or interesting information is provided to the driver. The driver can then modify driving styles and/or habits to minimize $CO_2$ production.

Figure 4:
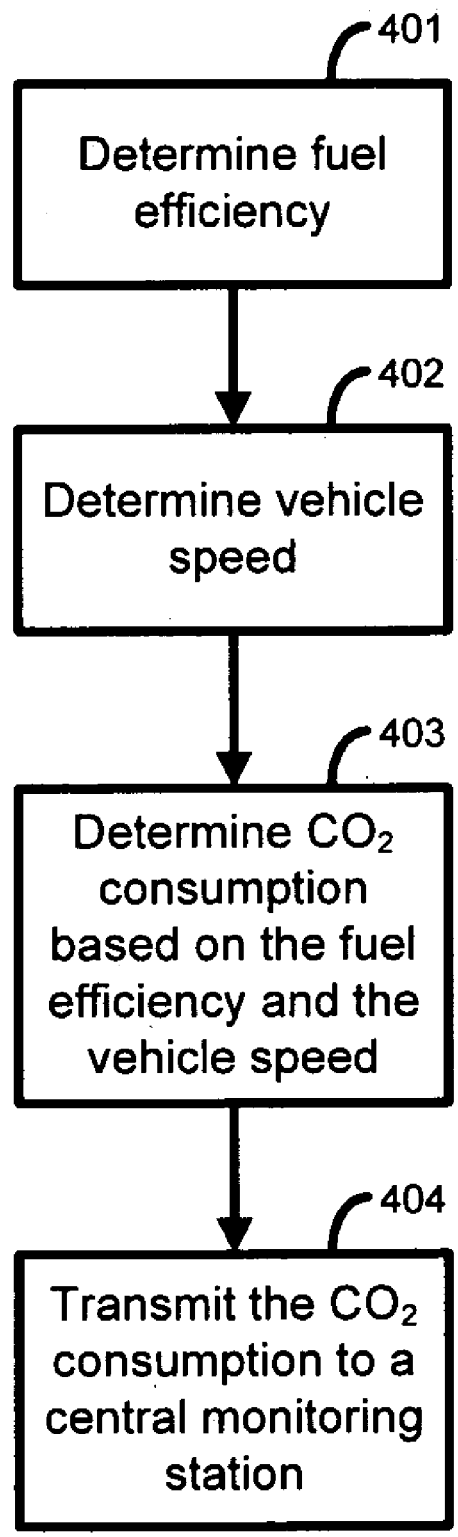
FIG. 4 is an exemplary method.

Ways to represent measured $CO_2$ data include, but are not limited to:

i. Weight of $CO_2$ per unit of distance
ii. Volume of $CO_2$ per unit of distance
iii. Weight of $CO_2$ per unit of time
iv. Volume of $CO_2$ per unit of time
v. Weight of $CO_2$ per unit of speed
vi. Volume of $CO_2$ per unit of speed
vii. Weight of $CO_2$ per unit of fuel consumed
viii. Volume of $CO_2$ per unit of fuel consumed
ix. Weight of $CO_2$ per unit of 2D geographic area
x. Volume of $CO_2$ per unit of 2D geographic area
xi. Weight of $CO_2$ per unit of 3D geographic area
xii. Volume of $CO_2$ per unit of 3D geographic area
xiii. Instantaneous Weight of $CO_2$ for all above xiv. Instantaneous Volume of $CO_2$ for all above
xv. Average Weight of $CO_2$ for all above
xvi. Average Volume of $CO_2$ for all above
xvii. Maximum Weight of $CO_2$ for all above
xviii. Maximum Volume of $CO_2$ for all above
xix. Minimum Weight of $CO_2$ for all above
xx. Minimum Volume of $CO_2$ for all above
xxi. Also the inverse of all of the above In one aspect, illustrated in FIG. 4, provided are methods for mobile $CO_2$ monitoring, comprising determining fuel efficiency at 401, determining vehicle speed at 402, determining $CO_2$ consumption based on the fuel efficiency and the vehicle speed at 403, and transmitting the $CO_2$ consumption to a central monitoring station and 404.

In one aspect, fuel efficiency can be miles per gallon (mi/gal), vehicle speed can be miles per hour (mi/hr), and determining $CO_2$ consumption comprises (mi/hr)/(mi/gal)*EF, wherein EF is an emissions factor in lbs/gal. It is specifically contemplated that other units of measurement can be used.

An emissions factor (EF), sometimes referred to as an emissions coefficient, is a representative value that relates the quantity of a pollutant released to the atmosphere with an activity associated with the release of that pollutant. These factors can be expressed as the weight of pollutant divided by a unit weight, volume, distance, or duration of the activity emitting the pollutant (e.g., kilograms of particulate emitted per megagram of coal burned). Such factors facilitate determination of emissions from various sources of air pollution.

The value of EF can be determined by the VTU. For example, in the case of flex-fuels and alternative fuels, the VTU can determine the value of EF based on the composition of the fuel. Fuel economy (MPG) can vary with fuel blend for a given engine and for a given driving style. In some aspects, ethanol is a mixture of various blends of ethanol fuel. For example, a tank of ethanol in a vehicle can comprise E10 (10% ethanol and 90% gasoline), E85 (85% ethanol and 15% gasoline), the like, and combinations thereof. The percentage of ethanol in the tank can vary as fuel types are mixed during refueling. An ECU (Engine Control Unit) can determine the ethanol % and report it to the VTU. The ECU can adjust fuel pressure, fuel/air ratio, spark timing, and the like. The ECU can also report these adjustments to the VTU. The VTU can be pre-programmed with a baseline 100% ethanol EF and baseline 100% gasoline EF. From these baseline EFS, the VTU can compute the EF for the blended fuel. This method can be implemented for any fuel blend and with any alternative fuel.

In one aspect, the methods can further comprise programming a first baseline EF for a first fuel into the VTU, programming a second baseline EF for a second fuel into the VTU, determining a fuel composition, wherein the fuel is composed of a percentage of the first fuel and a percentage of the second fuel, and determining the EF based on the first baseline EF, second baseline EF, and the fuel composition.

The value of EF can be obtained from a third party. Table 1 provides exemplary emissions factors obtained from a third party.

TABLE 1

Emission Factors
(Obtained from the U.S. Energy Information Administration
http://www.eia.doe.gov/oiaf/1605/coefficients.html)

| Fuel | Pounds $CO_2$ per Gallon (EF) |
|---|---|
| Aviation Gasoline | 18.355 |
| Distillate Fuel (No. 1, No. 2, No. 4 Fuel Oil and Diesel) | 22.384 |

TABLE 1-continued

Emission Factors
(Obtained from the U.S. Energy Information Administration
http://www.eia.doe.gov/oiaf/1605/coefficients.html)

| Fuel | Pounds $CO_2$ per Gallon (EF) |
|---|---|
| Jet Fuel | 21.095 |
| Kerosene | 21.537 |
| Liquefied Petroleum Gases (LPG) | 12.805 |
| Motor Gasoline | 19.564 |
| Petroleum Coke | 32.397 |
| Residual Fuel (No. 5 and No. 6 Fuel Oil) | 26.033 |

The methods can further comprise monitoring pollution readiness monitors for the presence of gases other than $CO_2$ in an exhaust stream and setting EF<the third party value if the pollution readiness monitors indicate a failure. The methods can further comprise determining a fuel mixture, setting EF<the third party value if the fuel mixture is rich, and setting EF<the third party value if the fuel mixture is lean.

Pollution readiness monitors can be used to determine whether emissions components have been evaluated. In other words, if all monitors are set to "ready," the emission components have been tested. These monitors can be included in an OBD system so overall vehicle condition can be assessed electronically. In some aspects, a vehicle can have up to twelve monitors built into the OBD-II computer system. The most common monitors are: Misfire, Fuel, Component, Oxygen Sensor, Catalyst Efficiency, Evaporative Emissions System, EGR System, and Secondary Air System. This can account for the presence of gases other than $CO_2$ in the exhaust stream when the vehicle is running at less than optimal points and repairs may be needed. Diagnostic Trouble Codes (DTCs) can also be read to determine a specific possible failure, such as one or more $O_2$ sensors, evaporative system Exhaust Gas Recirculator (EGR), misfire, Positive Crankcase Ventilation (PCV), and the like.

The methods can further comprise averaging the $CO_2$ consumption over a predetermined time increment. For example, the average $CO_2$ consumption can be determined for any increment of time, for example, 10, 20, 30, 40, 50, 60 minutes, etc. . . . The increment can be longer, such as measured in hours, days, months, years, etc. . . . Averaging the $CO_2$ consumption can take place in a VTU or at the central monitoring station.

The methods can further comprise determining a distance traveled and averaging the $CO_2$ consumption over the distance traveled. Determining the distance traveled can comprise one of retrieving distance traveled from an odometer, a GPS, or time traveled at a vehicle speed. Determining $CO_2$ consumption over the distance traveled can take place in a VTU or at the central monitoring station.

The methods can further comprise displaying the $CO_2$ consumption to a vehicle occupant. The $CO_2$ consumption can be displayed as lbs/hour, the average $CO_2$ consumption over a predetermined time increment, and/or $CO_2$ consumption over a distance traveled. Displaying the $CO_2$ consumption can comprise indicating $CO_2$ consumption on a gauge, for example a $CO_2$ lbs/hour gauge. The gauge can be digital or analog. Displaying can also be accomplished by indicating $CO_2$ consumption to a vehicle occupant on an in-vehicle display device.

The methods can further comprise determining location related data utilizing a GPS and tagging the $CO_2$ consumption with the location related data prior to transmission. The methods can further comprise determining $CO_2$ consumption for a geographic region. Determining $CO_2$ consumption for a geographic region can take place in a VTU or at the central monitoring station.

The methods can further comprise adjusting the air/fuel ratio to maximize $CO_2$ production. For example, the VTU can compare the determined $CO_2$ consumption and adjust the vehicle's air/fuel ratio either leaner or richer to maximize $CO_2$ production. The fuel mixture can be adjusted so that combustion is stoichiometric The methods and systems can utilize wireless communication to a central database. Such wireless communication can be, for example, PCS, cellular, wi-fi, Bluetooth, satellite, and the like. Such communication allows for real-time and/or near real-time reporting of $CO_2$ production. The reporting can combine $CO_2$ production reporting with one or more of, GPS data, traditional vehicle emissions data, vehicle diagnostics data, and the like. The methods and systems do not require a specific diagnostic bus (OBD2, J1708, etc.). Additionally, $CO_2$ production can be measured independently of existing diagnostic schemes.

Figure 5:
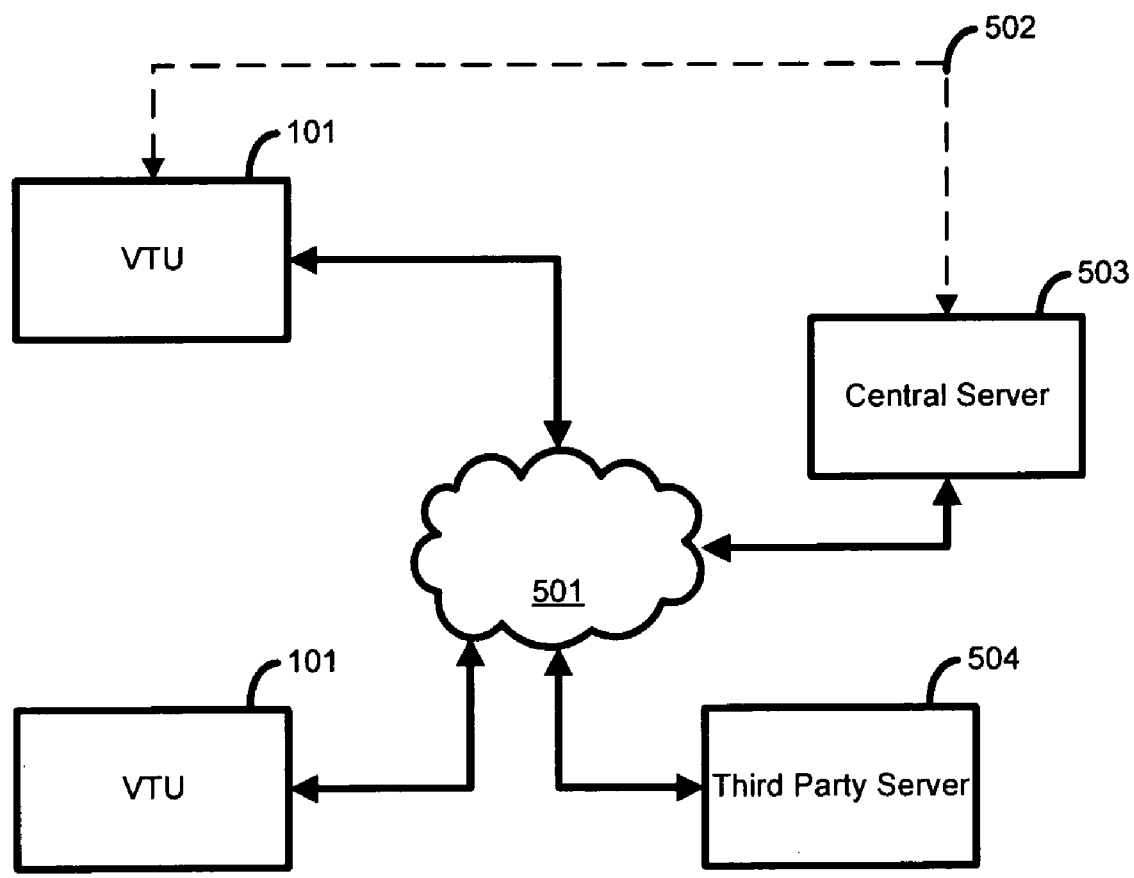
FIG. 5 illustrates an exemplary networked environment.

FIG. 5 illustrates an exemplary networked environment wherein the methods and systems disclosed can be practiced. All communication techniques used herein can optionally utilize varying levels of encryption to ensure privacy and prevent fraud. Various components can be in communication via a network such as the wireless network 501 or via direct wireless communication such as short range communication path 502. These communications can take one or more forms of computer communication, for example, electronic mail, data mining, web-browsing, financial transactions, Voice Over IP, any type of data transfer, and the like. Software resident on one or more VTU 101's can communicate with software resident on a central server 503. This communication can facilitate the reporting of $CO_2$ data, GPS data, emissions data, diagnostics data, and the like. This communication can be through the wireless network 501 and/or through a short range communication link 502, such as Bluetooth, WiFi, and the like. Central server 503 can maintain a central database of data relating to the one or more VTU 101's and the vehicles within which they are installed. Central server 503 can further analyze the data reported and, in some aspects, send commands and/or other data back to the one or more VTU 101's for further processing. Central server 503 can communicate with software resident on a third party server 504. This communication can facilitate transfer of data (such as $CO_2$ production data and the like) to be used by the third party for environmental analysis, taxing purposes, insurance purposes, and the like.

In some embodiments, software resident one or more VTU 101's can communicate with software resident on one or more of, other VTU 101's, central server 503, and third party server 504. In other embodiments, software resident on central server 503 can communicate with software resident on one or more of, VTU 101's and third party server 504. In further embodiments, software resident on third party server 504 can communicate with software resident on one or more of, VTU 101's and central server 503.

In one aspect, provided is a system for mobile $CO_2$ monitoring, comprising a vehicle telematics unit configured to determine $CO_2$ consumption and wirelessly transmit the determined $CO_2$ consumption and a central monitoring station configured to receive the determined $CO_2$ consumption from the vehicle telematics unit.

The vehicle telematics unit can be configured to perform the methods described herein. The central monitoring station can be configured to perform various steps of the methods described herein.

The vehicle telematics unit can be configured to determine $CO_2$ consumption by performing steps comprising determining fuel efficiency, determining vehicle speed, determining $CO_2$ consumption based on the fuel efficiency and the vehicle speed, and transmitting the $CO_2$ consumption to a central monitoring station.

The vehicle telematics unit can be configured to perform the steps comprising determining fuel efficiency in miles per gallon (mi/gal), determining vehicle speed in miles per hour (mi/hr), and determining $CO_2$ consumption as (mi/hr)/(mi/gal)*EF, wherein EF is an emissions factor in lbs/gal.

The vehicle telematics unit can be configured to perform the step comprising displaying the $CO_2$ consumption to a vehicle occupant as lbs/hour. The vehicle telematics unit can be configured to perform the step comprising averaging the $CO_2$ consumption over a predetermined time period. The vehicle telematics unit can be configured to perform the steps comprising determining a distance traveled and averaging the $CO_2$ consumption over the distance traveled.

The vehicle telematics unit can be configured to determine the distance traveled by performing the step comprising one of retrieving distance traveled from an odometer, a GPS, or time traveled at the vehicle speed. The vehicle telematics unit can be configured to perform the steps comprising determining location related data utilizing a GPS and tagging the $CO_2$ consumption with the location related data prior to transmission. The vehicle telematics unit can be configured to perform the step comprising determining $CO_2$ consumption for a geographic region.

The vehicle telematics unit can determine the value of EF. In one aspect, the vehicle telematics unit can be configured for performing the steps comprising retrieving a first baseline EF for a first fuel, retrieving a second baseline EF for a second fuel, determining a fuel composition, wherein the fuel is composed of a percentage of the first fuel and a percentage of the second fuel, and determining the EF based on the first baseline EF, second baseline EF, and the fuel composition.

In another aspect, the value of EF can be obtained from a third party. The vehicle telematics unit can be configured to perform the steps comprising monitoring pollution readiness monitors for the presence of gases other than $CO_2$ in an exhaust stream and setting EF<the third party value if the pollution readiness monitors indicate a failure. The vehicle telematics unit can be configured to perform the steps comprising determining a fuel mixture; setting EF<the third party value if the fuel mixture is rich; and setting EF<the third party value if the fuel mixture is lean. The vehicle telematics unit can be configured to perform the step comprising adjusting the fuel mixture to maximize $CO_2$ production. The fuel mixture can be adjusted so that combustion is stoichiometric.

Another aspect includes determining $CO_2$ output using information from a vehicle's Mass Airflow Sensor ("MAF sensor") and the vehicle's oxygen sensor, which may also be referred to as an $O_2$ sensor.

Refiners supply gasoline in many different formulations due to government regulations and to maintain performance as seasonal climate changes. Thus, the molecular weight for gasoline can vary slightly from supplier to supplier, from region to region, and from season to season. However, the aspect can use Octane, $C_8H_{18}$, as representative of typical gasoline sold in the U.S. In addition, using Octane to represent typical gasoline is probably provides better accuracy using the method described below than using government published Emission Factor values as described above, which may include a political component that skews calculated results toward higher values of usage. However, using EF with the method and system described above may provide sufficient accuracy if adjusted to account for unburned fuel in an engine's combustion chamber.

The speed×efficiency×EF calculation ("SEE") described above, while helpful and informative, may induce error in addition to the potentially biased EF values. This may occur because the SEE calculation may use a measurement of fuel consumed by an engine that may pass through the engine unburned and pumped out the engine's exhaust system. In addition, a leaking fuel system may include fuel that is pumped into a vehicle's surrounding environment in calculating the amount of carbon dioxide produced by the vehicle.

In addition to an erroneous calculation of carbon dioxide produced when basing the calculation on fuel wasted by leakage, basing a calculation of carbon dioxide output on fuel consumed by an engine may be erroneous because certain engine design factors differ from engine to engine. For example, greater overlap of an engine cylinder's exhaust valve and intake value being open at the same time can increase the amount of unburned fuel that an engine pumps through its exhaust. Also, the efficiency of an engine's combustion chamber and environmental conditions, such as, for example, temperature, barometric pressure, and humidity, can affect how completely a mixture of air and fuel combusts, leaving some fuel atoms unburned after combustion takes place.

Thus, instead of using the SEE calculation, using the MAF and $O_2$ sensors ("MAFOO") comprises another method for calculating carbon dioxide output. MAFOO uses data available from OBD II, data also typically available from a vehicle's onboard computer system. As with SEE, aftermarket, as well as OEM, diagnostic and telematics systems can use MAFOO to determine carbon dioxide output.

Figure 6:
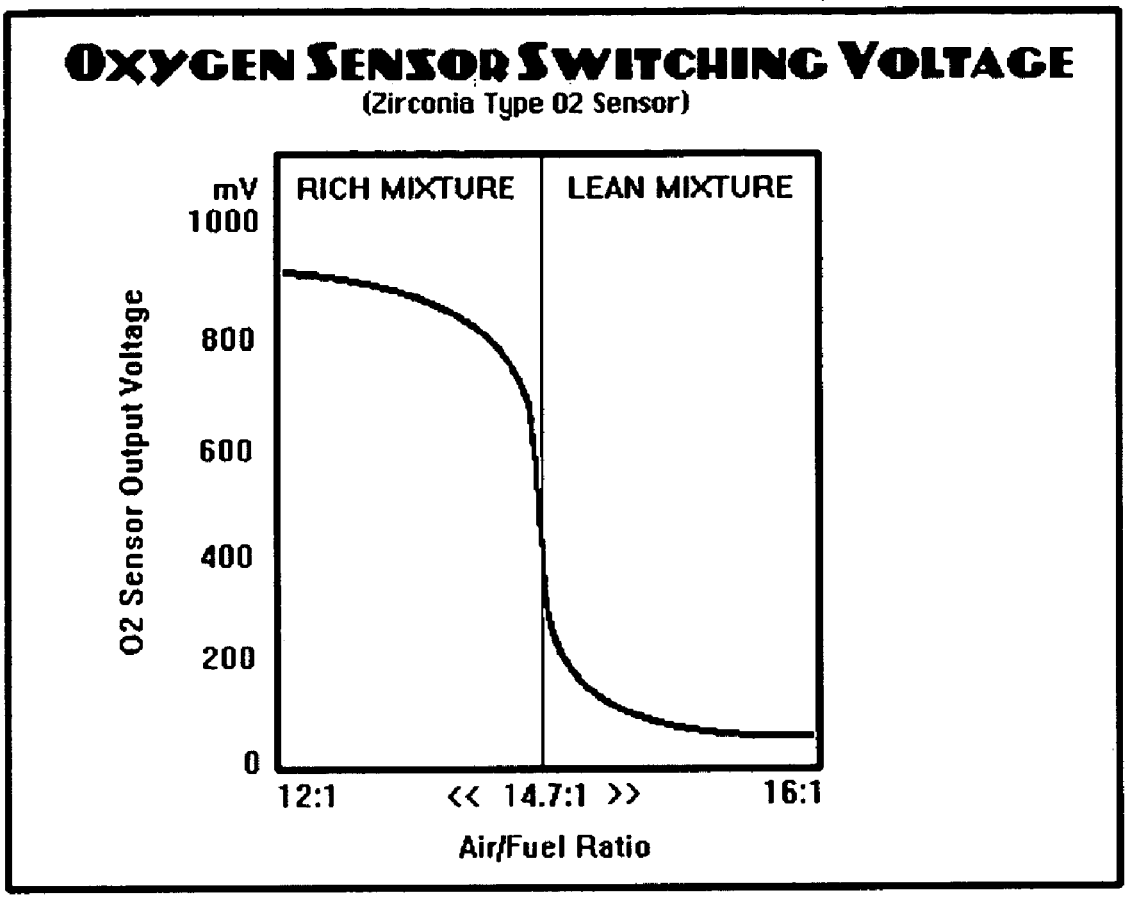
FIG. 6 illustrates a graph that plots exhaust oxygen sensor voltage with respect to intake air/fuel ratio.

Based on the assumption that Octane represents an average gasoline molecule, a method can use the response curve for a typical $O_2$ sensor shown in FIG. 6 combined with information from the $O_2$ sensor and the MAF sensor to accurately calculate $CO_2$ output of an engine.

As shown in FIG. 6, output from a typical $O_2$ sensor swings from approximately 0.950 mV at 12:1 A/F ratio to about 0.200 mV at 16:1. A conventional $O_2$ sensor generates its output voltage based on the difference between the amount of oxygen in the exhaust and the amount in the ambient atmosphere. The plot in FIG. 6 essentially calibrates an $O_2$ sensor's output voltage to A/F ratio. Thus, a method for calculating the $CO_2$ output of a vehicle uses the curve of the plot in FIG. 6.

A typical vehicle on board computer system has available to it a signal from a MAF sensor, the signal typically being a current amount that maintains the temperature of the wires that compose the sensor. Output from the MAF and oxygen sensors may also be present at a connection, such as an OBD II system port. Thus, a method run by an onboard computer system integrated with the vehicle coupled to an onboard system bus, such as, for example, a controller area network ("CAN") bus, can access the A/F ratio and the mass of air that an engine ingests. A computer device external to the vehicle can also run the method and acquire information from the MAF and oxygen sensors via the OBDII port. In addition, a system, either integrated with the vehicle, or an external system, can obtain sensor information either digitally via the CAN or OBD II port, or possibly even via analog tapping of the signals from the sensors' leads. Regardless of whether an OEM uses an integrated onboard computer to access sensor information and compute carbon dioxide output, or a user uses a computer device made by an aftermarket manufacturer that accesses sensor information, a method running on the computer can calculate the mass of fuel burned (rather than consumed, which may include unburned fuel), for example Octane, using a chemical conversion factor as follows:

maf=Air flow in grams per minute, or g/min, drawn into an engine;

λ=air to fuel ratio, or A/F ratio, of fuel mixture forced toward the combustion chamber represented by the signal received from the $O_2$ sensor;

maf÷λ=Fuel mass in g/min;

maf÷λ÷MPH÷60=fuel mass in g/mile.

To convert the mass of fuel to mass of $CO_2$, balance the equation for the combustion process of Octane as follows:

Octane→$C_8H_{18}$ $2C_8H_{18} + 25O_2 \rightarrow 16CO_2 + 18H_2O$

Next, determine the proportional weight of carbon in Octane as follows:

Proportion of Carbon in Octane=8C÷(8C+18H)

The relevant elements have the following atomic weights:
C=12.0107
H=1.00794
O=15.9994
Thus, the proportional weight of Carbon in Octane is 8×12.0101÷(8×12.0101+18×1.00794), or 0.841170.

Multiplying the proportional weight of Carbon in Octane by the mass of fuel the vehicle uses results in:

Fuel mass×proportional weight of carbon in Octane equals mass of carbon ("CG") in the fuel burned, or maf÷λ×0.84117.

Knowing the weights of the elements of $CO_2$, calculate the weight of $CO_2$ with the simple proportional relationship:

CG/$CO_2$ weight=C mol wt./$CO_2$ mol wt.

Resulting in the formula $CO_2$ weight=CG×44.0095/12.0107, or $CO_2$ weight=*maf*÷λ×0.84117×44.0095/12.0107.

Since a vehicle diagnostics system ("VDS"), or a VTU, receives signals from a mass air flow sensor and an $O_2$ sensor as a vehicle operates, a VDS, or a VTU, may sample these signals at a particular point in time. The VDS or VTU may use either sampled values from the vehicle's mass air flow sensor and $O_2$ sensor to compute running values of the amount of carbon in fuel that the vehicle's engine burns, or may calculate the amount of carbon in the fuel being burned at periodic intervals. In reality, even the running values comprise discrete values of carbon being burned based on samples, preferably acquired simultaneously, from the mass air flow and $O_2$ sensors. However, a user may perceive that a running value constantly updates, as compared to a perception that updates occur periodically when the sample period is long with respect to a VTU's, or VDS', fastest sample rate. In addition, one skilled in the art will appreciate that sampled values from the mass air flow sensor and $O_2$ sensor may be transmitted to a central computer via a network coupled to the VDS, or VTU, for calculation of the amount of CO2 being produced by a given vehicle, thus reducing the processing burden placed on a VDS or VTU.

Furthermore, since a VDS, or VTU, acquires samples from a mass air flow sensor and $O_2$ sensor empirically, a chemical conversion factor may include the proportional weight of carbon in a fuel molecule (for Octane this proportional amount is given above as 0.841170, and may be rounded if less precision is desired.) The chemical conversion factor may include the proportional weight of carbon in the fuel being burned and the ratio of the weight of a molecule of carbon dioxide to the weight of a carbon atom, or 44.0095/12.0107 as discussed above.

Thus, using Octane as the assumed fuel that an engine burns, a VTU, or VDS, may use a chemical conversion factor of (44.0095/12.0107)×0.841170, or 3.08772. The VTU, or VDS, or other device located remotely from either the VTU, or VDS, then multiplies the chemical conversion factor of 3.08772 by the weight of carbon burned by an engine to determine the amount of carbon dioxide produced per the units in which the amount of carbon burned is provided.

Accordingly, if dividing the signal from a mass air flow sensor by the signal from an $O_2$ sensor indicates that a vehicle is burning fifteen pounds of fuel per hour, then the amount of carbon dioxide produced would be 15×3.08772, or 46.3158 pounds of carbon dioxide per hour.

Dividing this result by speed of the vehicle results in weight of carbon dioxide per unit of distance traveled.

Depending on whether software loaded on and operating a VTU, or VDS, does not convert the raw signal output from an oxygen sensor to air/fuel ratio, or $\lambda$, a conversion factor that relates the signal from an oxygen sensor to $\lambda$ may be used. Thus, a raw output voltage from a vehicle's oxygen sensor can be used to determine $\lambda$. However, since the plot of voltage output from a typical oxygen sensor versus $\lambda$ is not linear, as shown in FIG. 6, a device manufacturer may store an equation, rather than a constant, in a memory of the device that uses signals from mass air flow and oxygen sensors to calculate carbon produced. The stored equation may describe the curve illustrated in FIG. 6, and then apply the equation to voltage measurements, or samples thereof, of a signal, or signals, from the vehicle's oxygen sensor, or sensors. Alternatively, the manufacturer may store an array of values that represent the plot of voltage versus $\lambda$. After measuring the voltage from the one, or more, oxygen sensors, and sampling the voltage at a predetermined rate, a computer system can determine $\lambda$ by applying the sampled values to the equation, or stored values, that represent the curve plotted in FIG. 6. Thus, measurements of a vehicle's oxygen sensor signal can be used together with measurements of the vehicle's mass air flow sensor signal to accurately calculate the amount of carbon in fuel that the vehicle's engine actually burns in the combustion process. Thus, the amount of carbon dioxide produced by the engine, relative to the amount of carbon in the fuel actually burned by the engine, can be accurately determined.

One skilled in the art will appreciate that sensor technology changes. For example, the description of the MAFOO embodiment above assumes a conventional mass air flow sensor with a range that swings between slightly less that 1.0 V and slightly less than 100 mV based on $\lambda$. However, recent advances in sensor technology include what some refer to as wideband oxygen sensors. A wideband sensor provides a more gradually changing output current based on $\lambda$, so the output signal has greater resolution. Although a wideband sensor outputs a current rather than a voltage, the parameter is represent is $\lambda$, or air to fuel ratio of the intake fuel charge.

Changes in MAF sensor technology may also occur, but the principles of MAFOO still apply regardless of the sensor technology used, or that may be used in the future. As long as sensors provide $\lambda$ and mass air flow information to a computer device, the computer device can use values stored for sensors that convert sensor electrical output to the information and units that the computer device can use for calculating carbon dioxide according to MAFOO as described above. Alternatively, some onboard vehicle management computer systems may provide the information in messages that have been scaled to the proper units and units of measure.

Figure 7:
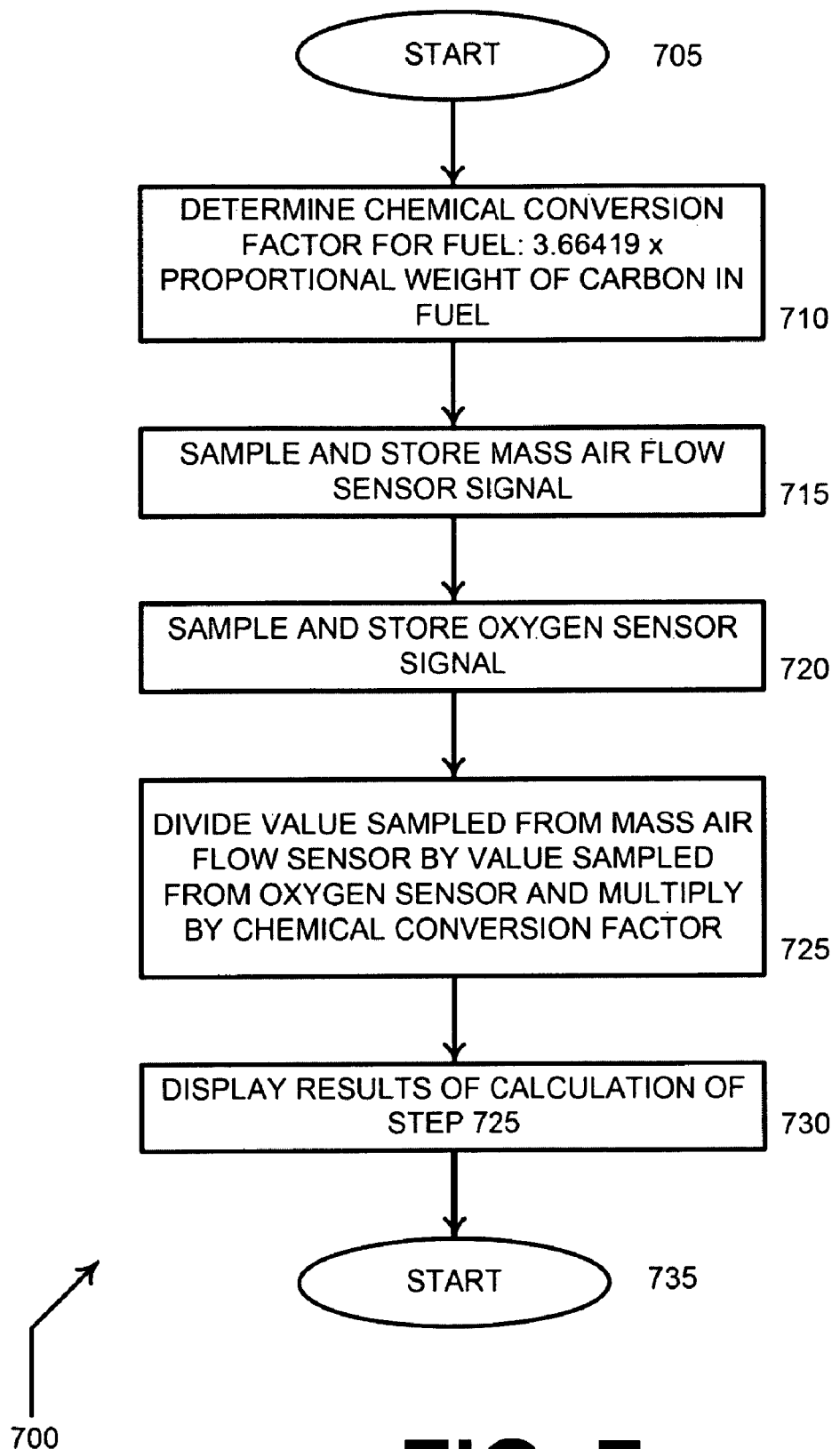
FIG. 7 illustrates a flow diagram of a method for determining the amount of carbon dioxide produced by a vehicle.

Turning now to FIG. 7, the figure illustrates a method 700 for determining the amount of carbon dioxide produced by a vehicle. Method 700 begins at step 705. At step 710, a chemical conversion factor is determined for the fuel being burned in the vehicle. For a typical vehicle burning gasoline, Octane represents typical fuel dispensed by fuel stations. In reality, fuel providers offer gasoline formulated as a complex mix of many chemicals, and the formulation can vary. However, the molecular weight of Octane falls between the lower and higher molecular weight values of the various formulations of gasoline typically offered for sale. Thus, if a vehicle operator cannot conveniently determine the actual formulation of gasoline used, using the chemical formula, and corresponding molecular weight, suffices as a good default.

Occasionally, a vehicle's operator may be able to conveniently determine the actual formulation of fuel dispensed. For example, a gas pump may include a memory coupled to a communication device that transmit a prestored value for chemical formula, molecular weight, and atomic weights of the various chemicals present in the gasoline formulation. A gasoline supplier may enter these values into the memory when delivering fuel to the fuel station, or a database associating the pump and the gasoline delivered thereto may provide these values wirelessly via the pumps communication device. A telematics device in the vehicle can wirelessly access the actual values from the pump's communication device of the fuel used to replace the default value of Octane, or other predetermined default values. Alternatively, the relevant values may be written on the pump and a vehicle's operator could enter the written values into an interface of their vehicle's telematics unit.

After either the default, or actual, values for the molecular and atomic weights of the fuel have been determined, the proportional weight of carbon atoms to the molecular weight of a fuel molecule are determined and the ratio is then multiplied by 3.66419, the molecular weight of a carbon dioxide molecule divided by the weight of a carbon atom. This calculation produces the chemical conversion factor either for Octane, or the actual fuel being used; for Octane, the chemical conversion factor is 3.0779196. Rounding the chemical conversion factor to two decimal places (3.08 for Octane, for example) may result in acceptable precision to reduce the burden on processors in a VTU, VDS, or remotely located computer.

At step 715, the vehicle's onboard computer system, or the vehicle's telematics system, samples a signal received from the vehicle's mass air flow sensor. The act of sampling may be performed in response to an instruction to sample the mass air flow sensor signal and store the sample to memory, or simply to store a sample that the vehicle's onboard computer system has generated. At step 720, the vehicle's onboard computer systems, or the vehicle's telematics system, samples a signal received from the vehicle's oxygen sensor. The act of sampling may be performed in response to an instruction to sample the oxygen sensor, or sensors, signal and store the sample to memory, or simply to store a sample that the vehicle's onboard computer system has generated:

Steps 710 through 720 may be performed in any order; for the most accurate carbon determination, the sample of the mass air flow sensor and the oxygen sensor should be acquired as near in time to one another as practicable.

At step 725, the method divides the value of the mass air flow sensor sample acquired at step 715 by the value from the sample from the oxygen sensor acquired at step 720, and then multiplies the quotient by the chemical conversion factor. The calculation at step 725 results in the amount of weight of carbon dioxide produced in the exhaust of the vehicle. The method may additionally convert the value of the amount of carbon dioxide produced from pounds per hour to pound per mile by dividing by the speed of the vehicle. At step 730, a display device displays the value of the amount of carbon dioxide calculated at step 725. The display device can include a video display, or a device for printing information on media. Method 700 ends at step 735.

A vehicle telematics unit can be configured to wirelessly transmit the determined $CO_2$ consumption through a cellular connection to a central location.

While the methods and systems have been described in connection with preferred embodiments and specific examples, it is not intended that the scope of the methods and systems be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made in the methods and systems without departing from the scope or spirit of the methods and systems. Other embodiments of the methods and systems will be apparent to those skilled in the art from consideration of the specification and practice of the methods and systems disclosed herein. It is intended that the specification and examples be considered as exemplary only, with a true scope and spirit of the methods and systems being indicated by the following claims.

What is claimed is:

1. A method for determining the weight of carbon dioxide produced by burning a mixture of air and fuel in an internal combustion engine using a value sampled from a mass air flow sensor signal and using a value sampled from an oxygen sensor signal, comprising:
   A. dividing the value sampled from the mass air flow sensor signal by the value sampled from the oxygen sensor signal;
   B. multiplying the quotient that results from performing step A by a chemical conversion factor; and
   C. processing the product that results from performing step B by a computer processor.

2. The method of claim 1 wherein the value sampled from the oxygen sensor signal is converted to an $O_2$ value that is used to lookup a corresponding air to fuel ratio in a table, and the value sampled from the mass air flow sensor signal is divided by the air fuel ratio from the table corresponding to the value sampled from the $O_2$ sensor when performing step A.

3. The method of claim 1 wherein the calculation of the chemical conversion factor assumes a particular fuel and a corresponding molecular composition thereof.

4. The method of claim 3 wherein the calculation of the chemical conversion factor assumes the particular fuel is Octane.

5. The method of claim 1 wherein the chemical conversion factor is the molecular weight of carbon dioxide divided by the atomic weight of carbon times the atomic weight of the carbon atoms in a molecule of the fuel divided by the molecular weight of the fuel.

6. The method of claim 1 wherein the step of processing includes storing the product that results from performing step B to a memory.

7. The method of claim 6 wherein the step of processing includes displaying the product stored in memory with a display device.

8. The method of claim 3 wherein the calculation of the chemical conversion factor assumes that the engine burns Octane and that the chemical conversion factor is $(44/12) \times (96/114)$, or 3.0877.

* * * * *